United States Patent [19]

Shuzo et al.

[11] Patent Number: 5,211,257
[45] Date of Patent: May 18, 1993

[54] POWER TRANSMISSION APPARATUS FOR FOUR-WHEEL DRIVE VEHICLE

[75] Inventors: Hirakushi Shuzo, Uda; Isogawa Hiromi; Nakagawa Yoshihiro, Kashiwara, all of Japan

[73] Assignee: Koyo Seiko Co., Ltd., Osaka, Japan

[21] Appl. No.: 668,946

[22] Filed: Mar. 13, 1991

[30] Foreign Application Priority Data

Mar. 15, 1990 [JP] Japan .................. 2-27049[U]

[51] Int. Cl.⁵ .......................................... B60K 17/344
[52] U.S. Cl. ...................................... 180/248; 192/60; 60/325
[58] Field of Search ............... 180/248, 249; 464/2, 464/160; 60/325; 192/59, 60

[56] References Cited

U.S. PATENT DOCUMENTS

| | | | |
|---|---|---|---|
| 2,679,306 | 5/1954 | Hartmann | 192/58 R |
| 3,686,976 | 8/1972 | Philippi | 192/61 |
| 3,773,130 | 11/1973 | Mueller | 180/250 |
| 3,926,287 | 12/1975 | Taylor | 60/325 X |
| 4,676,336 | 6/1987 | Hiramatsu et al. | 180/233 |
| 4,727,966 | 3/1988 | Hiramatsu et al. | 180/249 X |
| 4,741,407 | 5/1988 | Torii et al. | 180/248 X |
| 4,850,447 | 7/1989 | Hirakushi et al. | 180/248 |
| 4,881,626 | 11/1989 | Hiramatsu | 192/60 |
| 4,919,248 | 4/1990 | Hiramatsu et al. | 180/248 |
| 4,995,491 | 2/1991 | Hiramatsu et al. | 192/60 X |
| 5,074,825 | 12/1991 | Hamasaki et al. | 180/248 X |

FOREIGN PATENT DOCUMENTS

| | | |
|---|---|---|
| 116526 | 6/1985 | Japan. |
| 61-183733 | 11/1986 | Japan. |
| 63-22233 | 2/1988 | Japan. |
| 790035 | 1/1958 | United Kingdom. |

Primary Examiner—Margaret A. Focarino
Assistant Examiner—Kevin Hurley
Attorney, Agent, or Firm—Darby & Darby

[57] ABSTRACT

A power transmission apparatus for four-wheel drive vehicle which uses a hydraulic pump to absorb a rotational speed difference caused between front and rear wheels or left side and right side wheels to thereby materialize the four-wheel drive state and which is provided at a fixed housing with a variable throttle for adjusting oil pressure at the hydraulic pump. The variable throttle is adjustable of a degree of its opening by brake oil pressure generated by the braking action during the drive operation of an electromagnetic actuator or oil pressure introduced into a power cylinder disposed in a steering mechanism. Also, outside the fixed housing are provided fins for dissipating the heat content of operating oil at the hydraulic pump. Furthermore, on the slidable contact surface of a casing of the hydraulic pump with the fixed housing is provided sealing means for preventing the operating oil in the hydraulic pump from leaking therefrom.

17 Claims, 8 Drawing Sheets

POWER TRANSMISSION APPARATUS FOR FOUR-WHEEL DRIVE VEHICLE

BACKGROUND OF THE INVENTION

1. Field of the Invention

The present invention relates to a power transmission apparatus for four-wheel drive vehicle for absorbing a rotational speed difference between the front wheels and the rear wheels or the left side wheel and the right side wheel by means of oil pressure generated in a hydraulic pump.

2. Description of Related Art

A four-wheel drive vehicle running by transmitting a driving force of an engine to all four wheels is of course superior in traveling stability on a road lower in a coefficient of friction, such as a snow-covered road or a frozen road, and a bad road, such as a gravel road or a dirt road, and also, has high traveling stability in the acceleration and deceleration and the high speed running even when traveling on a paved road. Such four-wheel drive vehicle has hitherto been especially highlighted as the vehicle realizable of comfortable traveling in spite of any road condition, natural condition, such as weather condition, and running state.

The four-wheel drive vehicle is basically realizable by directly connecting four wheels of front, rear, left side and right side to an engine of driving source respectively. In this case, different turning paths between the front and the rear wheels or between the left side and the right side wheels make it impossible to absorb a rotation speed difference generated between both wheels during the turning. Especially, during the sharp turning, the rear wheel inside the turning circle causes a slip and is dragged: so-called tight corner braking phenomenon occurs, thereby creating the problem that the turning performance deteriorates. Therefore, recently, such four-wheel drive vehicle has been dominant that is provided with a power transmission apparatus which can absorb the rotation speed difference between the front and the rear wheels or the left side and the right side wheels and distribute the driving force to both wheels corresponding to the rotation speed difference. A hydraulic pump for generating oil pressure corresponding to the rotational speed difference is used as one of the power transmission apparatuses, which is so constructed that a rotor connected in association with one of the front and the rear wheels is housed in a casing connected in association with the other, thereby causing between the rotor and the casing relative rotation corresponding to the rotational speed difference between both wheels. Magnitude of oil pressure generated within the hydraulic pump, with respect to the characteristic thereof, corresponds to the speed of relative rotation between the rotor and the casing, in other words, the extent of rotational speed difference between the front and the rear wheels or the left side and the right side wheels. Since the generated oil pressure acts between the rotor and the casing to restrict the relative rotation, the driving force corresponding to the rotational speed difference between both wheels is transmitted from one of the front and the rear wheels or the left side and the right side wheels to the other, thereby the four-wheel drive state is realized.

In such four-wheel drive device, in order to prevent generation of the aforesaid tight corner braking phenomenon, it is earnestly desired to reversibly obtain low generated oil pressure so as to loosely connect both wheels when the rotational speed difference between the front and the rear wheels or between the left side and the right side wheels is smaller. When the rotational speed difference between those wheels is larger, it is earnestly desired to reversibly obtain high generated oil pressure so as to tightly connect both wheels. In order to meet such requirement, adjusting means for adjusting oil pressure generated in the hydraulic pump must be used. Herein, since both the rotor and the casing rotate, when adjusting means for adjusting oil pressure is provided either at the rotor or the casing, it is difficult to perform the adjustment.

SUMMARY OF THE INVENTION

The present invention is power transmission apparatus for four-wheel drive vehicle using a hydraulic pump to absorb a rotational speed difference between the front and the rear wheels or between the left side and the right side wheels, in which adjusting means for adjusting oil pressure of the hydraulic pump is provided in a fixed housing. As the adjusting means, a variable throttle provided with a retractive spool is used. When the adjusting means (spool) is operated, an electromagnet solenoid may be used, brake oil pressure generated by the braking action may be used, or oil pressure introduced into a power cylinder disposed in a steering mechanism may be used. Also, outside the fixed housing are provided fins for radiating the heat of operating oil in the hydraulic pump. Furthermore, at sliding surfaces of the hydraulic pump and the fixed housing are provided sealing means for preventing the operating oil in the hydraulic pump from leaking.

Furthermore, power transmission apparatus for four-wheel drive vehicle, which absorbs the rotational speed difference between the front and the rear wheels or between the left side and the right side wheels by operating a differential gear and the hydraulic pump attached thereto, and has adjusting means for adjusting oil pressure in the hydraulic pump in the fixed housing, the differential gear and hydraulic pump being integrally constituted with each other.

An object of the present invention is to provide has power transmission apparatus for four-wheel drive vehicle which has the adjusting means for adjusting oil pressure generated within the hydraulic pump in the fixed housing, whereby the oil pressure is easily adjusted and a stable four-wheel drive state is realized in spite of any conditions, such as road surfaces or weather.

Another object of the present invention is to provide power transmission apparatus for four-wheel drive vehicle which uses a variable throttle as the adjusting means to adjust the degree of opening of variable throttle corresponding to the traveling state of vehicle, whereby a proper drive characteristic can be obtained.

Still another object of the present invention is to provide a power transmission apparatus for four-wheel drive vehicle, which operates the variable throttle by brake oil pressure, whereby the braking action is not hindered during the quick braking and the four-wheel drive state is not eliminated by the braking action in a vehicle provided with an antiskid braking device.

A further object of the present invention is to provide a power transmission apparatus for four-wheel drive vehicle, which operates the variable throttle by oil pressure introduced in a power cylinder, whereby tight corner braking phenomenon is prevented and the four-wheel drive state is not eliminated by steering during the running.

A still further object of the present invention is to provide a power transmission apparatus for four-wheel drive vehicle, which has fins for radiating the heat of operating oil, whereby a temperature rise of the operating oil can be restrained and a change in the drive characteristic by the temperature rise can be reduced.

Yet another object of the present invention is to provide a power transmission apparatus for four-wheel drive vehicle, which has sealing means on the sliding surface between the fixed housing and the casing, whereby the leaking of operating oil from a gap between the fixed housing and the casing is prevented in spite of magnitude of pressure of operating oil, and sealing thereof is performed effectively.

A yet further object of the present invention is to provide a power transmission apparatus for four-wheel drive vehicle, which integrally constitutes the differential gear mechanism and hydraulic pump, whereby miniaturization of device in comparison with the conventional one is possible and highly rotational accuracy can be realized.

The above and further objects and features of the invention will more fully be apparent from the following detailed description with accompanying drawings.

DESCRIPTION OF THE PREFERRED EMBODIMENTS

Next, embodiments of the present invention will be detailed in accordance with the accompanying drawings.

Figure 1:
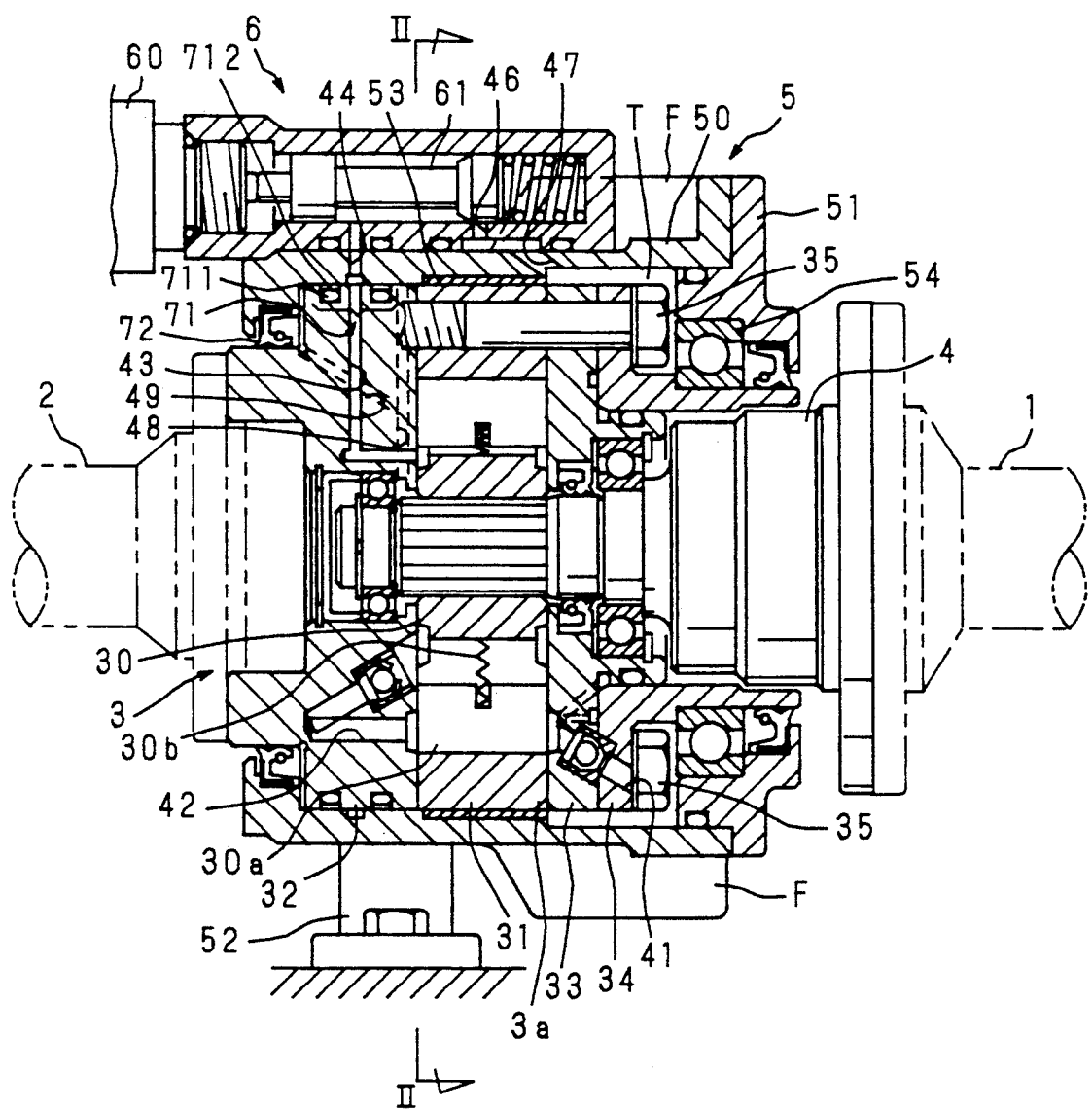
FIG. 1 is a longitudinally sectional view of a power transmission apparatus for four-wheel drive vehicle of the present invention.

A first embodiment of the invention is shown in FIG. 1, in which a power transmission apparatus for four-wheel drive vehicle has a hydraulic pump interposed between an input shaft 1 rotable in association with one of front and rear wheels and an output shaft 2 rotable in association with the other, and the hydraulic pump transmits a driving force from the input shaft 1 to the output shaft 2 through oil pressure generated corresponding to a rotational speed difference caused between the shafts 1 and 2, in other words, caused between the front and rear wheels. For the hydraulic pump for example, a vane pump 3 is used as shown.

Figure 2:
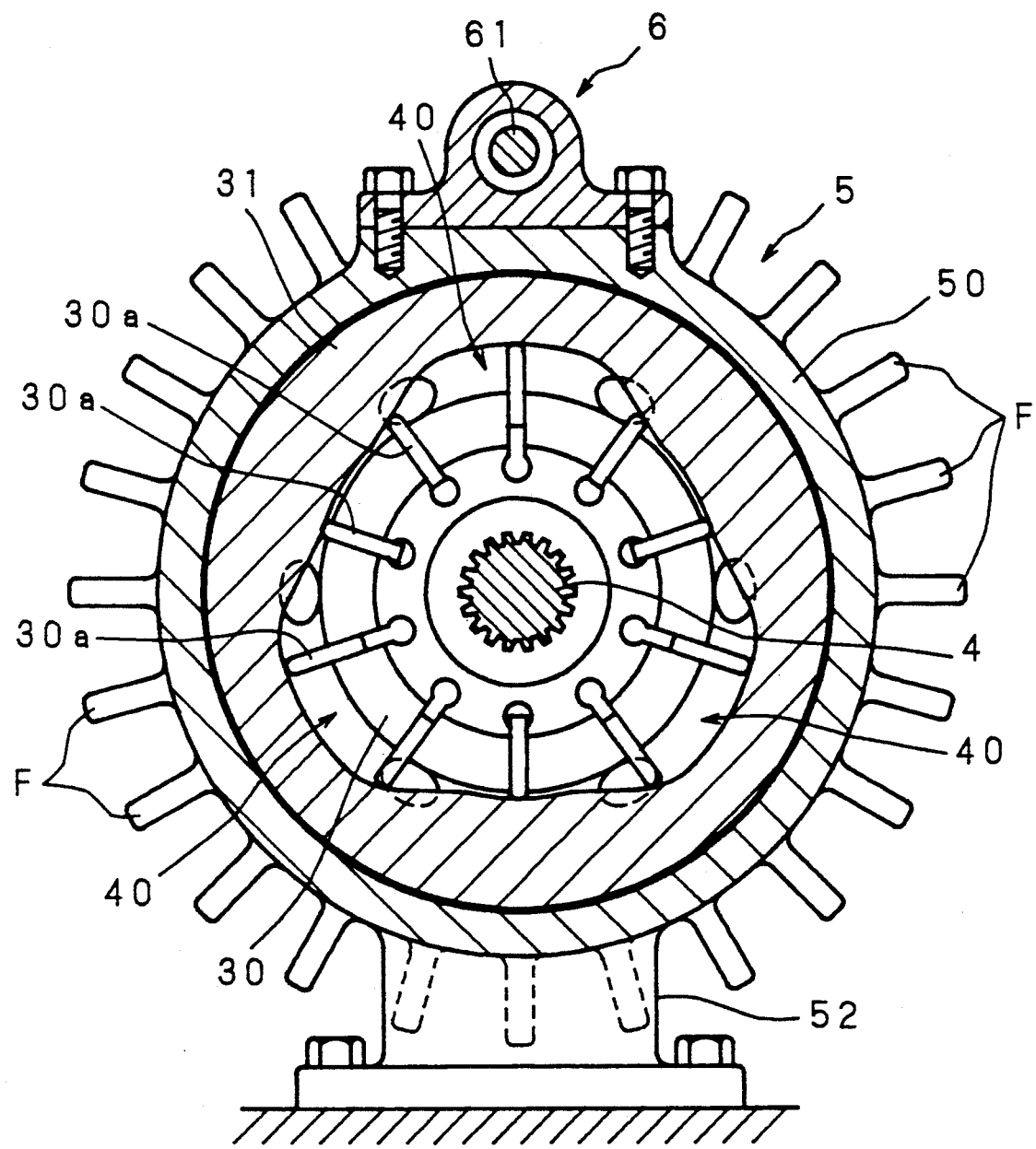
FIG. 2 is a cross-sectional view taken on the line II—II in FIG. 1.

The vane pump 3 is provided with a short cylindrical rotor 30 and a casing 3a for housing the rotor 30 coaxially rotatably therein. The casing 3a is provided with a cam ring 31 shaped in cross section as shown in FIG. 2 and short in axial length and of wall eccentricity, a hollow disc-like shaped pressure plate 32 larger in a thickness, an annular disc-like-shaped side plate 33 having a coaxially extending cylindrical portion in the inner periphery side, and a similarly shaped holder 34, these members having equal outer diameter. The side plate 33 and holder 34 is coaxially integrated in such a manner that the cylindrical portion of the former is fitted into that of the latter. After the side plate 33, holder 34 and pressure plate 32 are coaxially positioned at both axial sides of the cam ring 31, the disc portions of holder 34 and side plate 33 and the cam ring 31 are perforated axially in this order and are integrally coupled with each other by a plurality of fixing bolts 35 screwable with threaded bores formed at the pressure plate 32, so that, as shown in FIG. 1, a cavity enclosed by the cam ring 31, pressure plate 32 and side plate 33, is formed within the cam ring 31. The output shaft 2 is coaxially connected to the outside surface of pressure plate 32, the easing 3a being adapted to rotate around the axis of the output shaft 2 in association with rotation thereof.

The rotor 30 is provided with a plurality of grooves, each of which has a predetermined radial depth from the outer periphery and is circumferentially spaced at regular intervals, and rectangular flat vanes 30a are inserted into the grooves respectively. Each vane 30a freely advances and reteats along the housing groove radially of the rotor 30, and is biased radially outwardly thereof by a coil spring 30b interposed between each vane 30a and the bottom of each housing groove as shown in FIG. 1. The rotor 30 is coaxially contained in the cavity inside the cam ring 31. At a plurality of recesses at the inner periphery of cam ring 31 are formed a plurality (three in this embodiment) of crescent-shaped pump chambers 40 as shown in FIG. 2. A rotary shaft 4 for the rotor 30 is inserted into the hollows of the side plate 33 and pressure plate 32 from the side plate 33 side and coaxially supported in the interior of casing 3a by ball bearings fixedly fitted into both hollows. The rotor 30 is fitted onto an intermediate portion of rotor shaft 4 and is spline-connected therewith. Also, the projecting end of rotor shaft 4 from the side plate 33 is coaxially connected to the input shaft 1. The rotor 30 is connected to the input shaft 1 through the rotor shaft 4 so as to coaxially rotate with the casing 3a in association with the rotation of input shaft 1 relative rotation corresponding to the rotational speed difference caused between both the shafts 1 and 2, that is, between the front and the rear wheels, is generated between the rotor 30 and the casing 3a.

In the drawing, reference numeral 5 designates a fixed housing which is provided with a cylindrical housing body 50 smaller in thickness and a lid flange 51 of annular disc-like shape and fixed to the one opening of the body 50, and which is fixed to part of a car body through a leg 52 projecting from the outer surface of housing body 50. The outer periphery of cam ring 31 is supported through bearing metal 53 fixedly fitted into the housing body 50 and the outer periphery of cylindrical part of the holder 34 is supported through a ball bearing 54 fixedly fitted into the hollow of lid flange 51, and the vane pump 3 rotates freely within the fixed housing 5. The inner periphery of the housing body 50 is larger at the lid flange 51 side than at the fitted bearing metal 53 side. Operating oil of the vane pump 3 is charged in an annular oil storage T formed between the inner periphery of the larger diameter portion of housing body 50 and the outer peripheries of side plate 33 and holder 34. In order to promote cooling of operating oil charged in the oil storage T, a number of heat radiation fins F are projected from the outer surface of fixed housing 5. The fins F, as shown in FIG. 2, are disposed on the outer periphery of housing body 50 circumferentially thereof and spaced at regular intervals and their lengthwise ranges are respectively correspond to the oil storage T in the fixed housing 5 as shown in FIG. 1.

The oil storage T communicates with every pump chamber 40 of vane pump 3 at both circumferential sides of pump chambers 40 through suction oil passages 41 perforating the holder 34 and the disc portion of side plate 33 thickness-wise thereof and fitted on the way check valves for permitting the operating oil only to flow-in from the oil storage T. At the pressure plate 32, an oil introduction passage 42 opening one end of each pump chamber 40 and fitted on the way a check valve for permitting the operating oil only to flow-out from the pump chamber 40 is formed in a manner of radially inwardly folding. Each pump chamber 40 communicates with the bottom of housing grooves of each vane 30a in the rotor 30 through each oil introduction passage 42 opening at both circumferential sides. The hollow of pressure plate 32 communicates with the oil storage T by a oil reflux bore 48 perforating the pressure plate 32 radially thereof and through a gap between the housing body 50 and the casing 3a. Furthermore, the bottom of each housing groove communicates with a variable throttle 6 fixed to the outside surface of housing body 50 through a discharge oil passage 43 extending axially from the inside surface of pressure plate 32 and extending radially outwardly from the axial end of passage 43 and opening at the outer periphery of pressure plate 32, an annular groove formed at the inner periphery of housing body 50 corresponding to the open end of passage 43, and oil communication passage 44 perforating the peripheral wall of housing body 50.

In the vicinity of the opening end of discharge oil passage 43, a first sealing member 71 comprising an O-ring 711 and a seal ring 712 for preventing operating oil from leaking from the opening to the outside of the housing body 50 and to the oil storage T and a second sealing member 72 comprising oil seal are interposed between the housing body 50 and the pressure plate 32. The variable throttle 6 is provided with a spool 61 movable corresponding to advance and retreat of a solenoid 60 and communicates with the oil storage T through a throttle oil passage 46 changing in the degree of opening corresponding to movement of spool 61 and a communication oil passage 47 perforating a peripheral wall of housing body 50.

Figure 3:
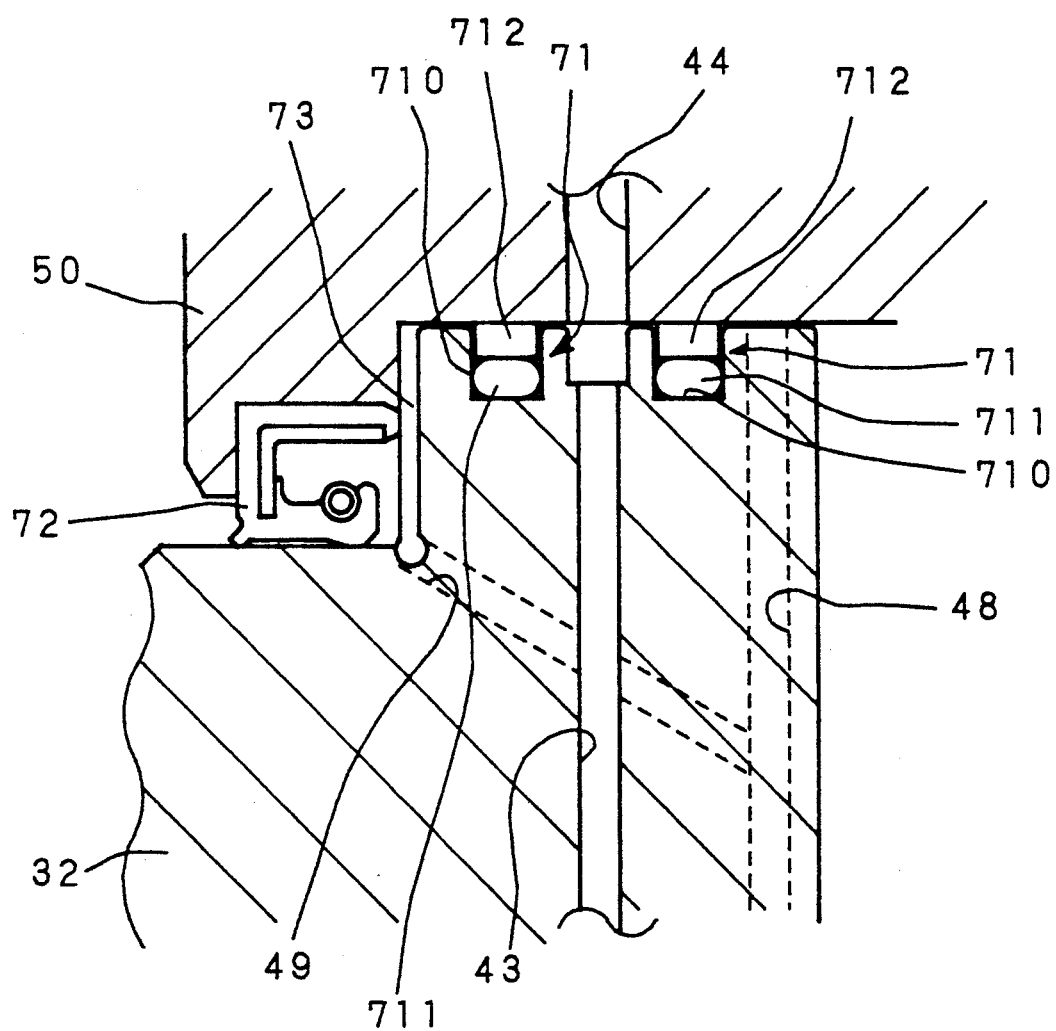
FIG. 3 is an enlarged sectional view in the vicinity of first and second sealing members in FIG. 1.

FIG. 3 is an enlarged sectional view of the vicinity of the first and the second sealing members 71 and 72, in which grooves 710 rectangular in section are respectively provided at the input shaft 1 side and the output shaft 2 side of the opening end of discharge oil passage 43 outside the pressure plate 32. At the bottom of grooves 710 are circumferentially provided the O-rings 711 and in the grooves 710 are circumferentially provided the seal rings 712 of fluororesin each rectangular in section, in a manner of overlapping the outside of O-rings 711 respectively. The O-ring 711 and sealing 712 constitute the first sealing member 71. The second sealing member 72 comprising oil seal is interposed between the pressure plate 32 and the housing 50 at the ends of the output shaft 2 side thereof. A space between the first sealing member 71 and the second sealing member 72 and enclosed with the pressure plate 32, housing body 50 and second sealing member 72, is a leakage oil conduit 73 into which the operating oil leaking from the first sealing member 71 flows into, and which communicates with the reflux bore 48 through a leakage oil passage 49 formed in the pressure plate 32.

In a case where a rotational speed difference is generated between the front and the rear wheels and relative rotation is caused between the rotor 30 of vane pump 3 and the cam ring 31 corresponding to the difference, the operating oil sealed in the oil storage T is taken into the pump chamber 40 through the suction oil passage 41 at the upstream side in the direction of relative rotation, and sealed between the adjacent vanes 30a in the pump chamber 40 to be rotated in the direction of relative rotation and raises pressure, and introduced into the bottom of containing grooves of each vane 30a through the oil introduction passage 42. The introduced oil, with a biasing force of coil spring 30b, biases the vanes 30a radially outwardly to press the foremost end of each vane 30a hard against the inner periphery of cam ring 31. The pressure of the oil sealed between the adjacent vanes 30a in the pump chamber 40 is surely raised without leaking from the sliding portion between the foremost end of vane 30a and the inner periphery of the cam ring 31 to the low pressure side. The introduced oil is further introduced into the variable throttle 6 through the discharge oil passage 43 and the communication oil passage 44 and its pressure is reduced when flowing in the throttle oil passage 46 having the degree of opening of the throttle corresponding to the moving position of spool 61, and returns to the oil storage T through the communication oil passage 47.

Thus, in each pump chamber 40 of vane pump 3, the operating oil in the oil storage T circulates corresponding to the relative rotation caused between the rotor 30 and the cam ring 31 by the rotational speed difference generated between the front and the rear wheels as the above-mentioned, thereby oil pressure corresponding to magnitude of the relative rotation is generated. A driving force corresponding to the rotational speed difference generated between the shafts 1 and 2, that is, between the front and the rear wheels, is transmitted from the input shaft 1 connected to the rotor 30 through the rotor shaft 4, to the output shaft 2 connected to the cam ring 31 through the pressure plate 32, through the generated oil pressure, operating to restrain the relative rotation between the outer periphery of rotor 30 and the inner periphery of cam ring 31. At this time, the operating oil sealed in the oil storage T circulates while repeating pressure rise at each pump chamber 40 and pressure reduction at the discharge side of each pump chamber 40, especially at the variable throttle 6.

When the rotational speed difference between the front and the rear wheels is larger and a large relative rotation caused between the rotor 30 and the cam ring 31 continues, pressure of operating oil is high. In this case, each O-ring 711 is compressed widthwise of the groove 710 and extends the depthwise direction thereof by the pressure of operating oil, thereby press each seal ring 712 hard against the housing body 50. Hence, the sealing force by the seal ring 712 becomes larger, whereby the operating oil leaking out from the opening end of discharge oil passage 43 through the gap between the housing body 50 and the pressure plate 32 is sealed by the first sealing member 71.

On the other hand, when the rotational speed difference between the front and the rear wheels is smaller and the relative rotation between the rotor 30 and the cam ring 31 is smaller, pressure of operating oil is low. In this case, since the each O-ring 711 is compressed and extends depthwise of the groove 710 to a small extent, the housing body 50 is pressed weakly against seal ring 712. Therefore, the operating oil leaks from the first sealing member 71 to the second sealing member 72, and the leaking oil is sealed by the second sealing member 72 and then returns to the oil storage T through the leakage oil passage 49 and reflux bore 48.

Thus, when pressure of operating oil is high, the first sealing member 71 seals the operating oil and, when low, the second sealing member 72 seals it. Hence, even when either high or low, the operating oil does not leak through the gap between the housing 50 and the pressure plate 32.

Also, since the seal ring 712 at the first sealing member 71 is made of fluororesin, the first sealing member 71 is superior not only in heat resistance but wear resistance and has good durability when it seals the gap between the rotatable pressure plate 32 and the fixed housing body 50.

Now, when the rotational speed difference between the front and the rear wheels is larger and a large relative rotation caused between the rotor 30 and the cam ring 31 continues, the temperature of the operating oil rises. However, when the circulating operating oil returns to the oil storage T as the above mentioned, effective heat exchange between the operating oil and the air flowing outside the fixed housing 5 is carried out through the heat radiation fins F, thereby an excessive temperature rise in oil can be avoided. Accordingly, the fear is reduced that the pressure characteristic of the vane pump 3 changes due to viscous damping by the oil temperature rise, whereby the amount of transmission of driving force using generated pressure of vane pump 3 is not affected by the oil temperature rise and a stable drive characteristic is always obtainable.

In addition, in this embodiment, the first sealing member 71 is provided outside the pressure plate 32, which may alternatively be provided inside the housing body 50. The number of fixed housings 5 circumferentially disposed, a lengthwise range of them and a mode of disposing the heat radiation fins F, are, of course, not limited to those shown in this embodiment.

Figure 4:
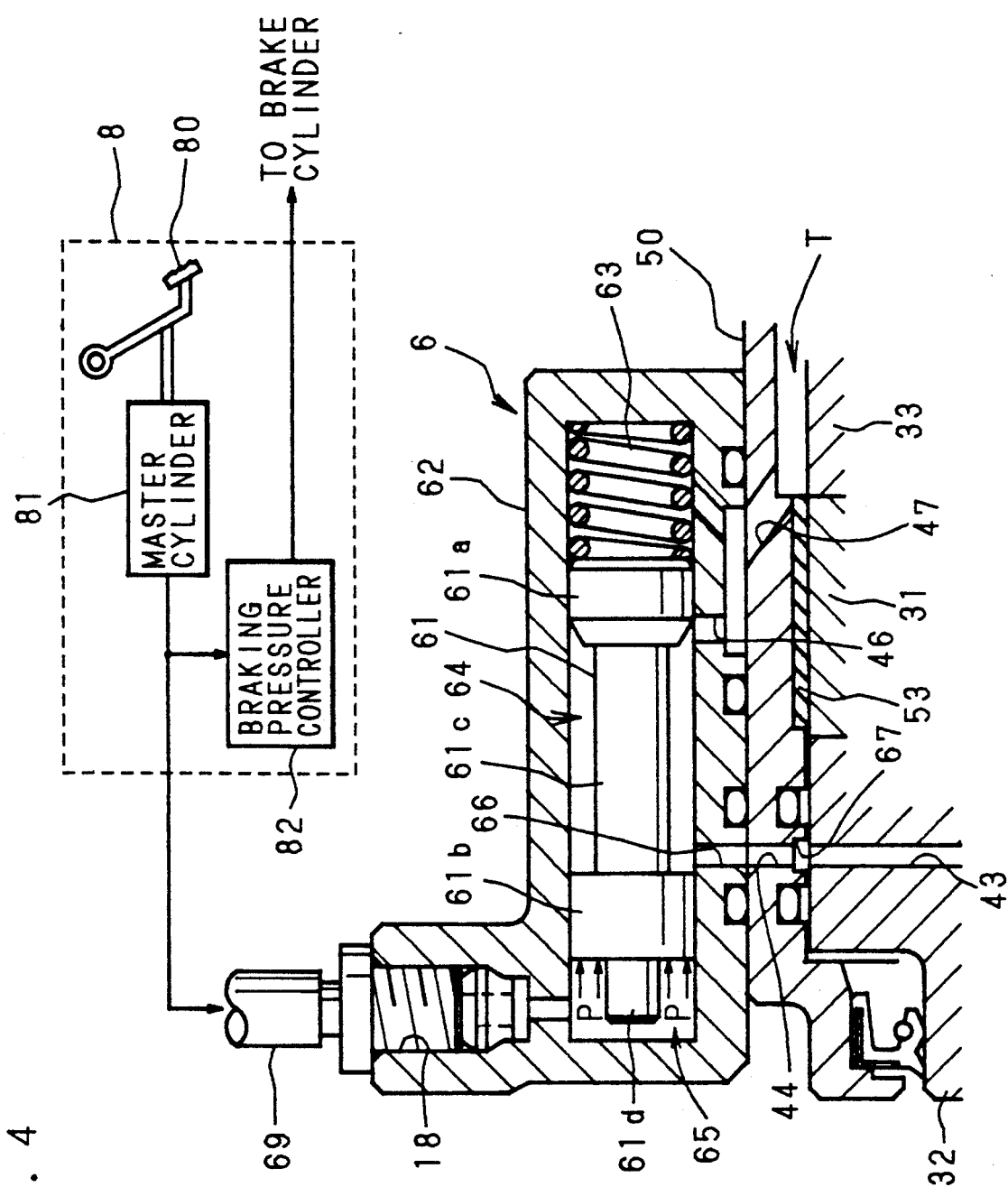
FIG. 4 is an enlarged view of characteristic portions of a second embodiment of the present invention.

Next, explanation will be given on a second embodiment of the present invention on reference to FIG. 4. In the second embodiment, a variable throttle for adjusting the oil pressure of operating oil is constituted to be operated by pressure of brake oil. FIG. 4 is an enlarged view showing a characteristic portion of the second embodiment, in which the components same as those in FIG. 1 are designated with the same reference number.

A variable throttle 6 in this embodiment is provided with a spool housing 62 fixed to the outer surface of a housing body 50 and a spool 61 fitted in the spool housing 62, axially slidable thereof. The spool 61, as shown, is so constructed that the facing surfaces of a pair of larger diameter portions 61a and 61b axially spaced at a proper distance, are coaxially connected with each other by a connecting portion 61c smaller in diameter than the portions 61a and 61b, with a stopper 61d short and smaller in diameter projecting from the reverse surface of larger diameter portion 61b. Spool 61 is inserted within the spool housing 62 and biased from the larger diameter portion 61a toward the larger diameter portion 61b, in other words, leftwardly in the drawing, by means of a coil spring 63 interposed between one bottom of the interior of spool housing 62 and the end surface of larger diameter portion 61a facing to the bottom. By the spool 61 thus inserted into the spool housing 62, inside the spool housing 62 are formed a first chamber (oil flow chamber) 64 formed outside the connecting portion 61c and between the facing surfaces of larger diameter portions 61a and 61b and a second chamber (pressure introduction chamber) 65 formed outside the stopper 61d and between the reverse surface of larger diameter portion 61b and the other bottom of the interior of spool housing 62.

At the spool housing 62, a pair of communicating oil passages 66 and 46 perforate the peripheral wall of the housing 62 at the fixing side to the housing body 50 and are opened at the one ends into the interior of the oil flow chamber 64 respectively. The other ends of the communicating oil passages 66 and 46 communicate with communicating oil passages 44 and 47 perforating the peripheral wall of housing body 50 respectively. One communicating oil passage 44 communicating with the communicating passage 66 opening at the larger diameter portion 61b side of spool 61 is opened in an annular groove 67 formed at the inner periphery of housing body 50 corresponding to the opening end of the discharge oil passage 43 at the outer periphery of pressure plate 32. The oil flow chamber 64 communicates with the discharge oil passage 43 through the annular groove 67 and communicating oil passages 44 and 66. The other oil passage 47 communicates with the communicating oil passage 46 opening at the larger diameter portion 61a side is opened at the inner periphery of larger diameter of the housing body 50. The oil flow chamber 64 communicates with the oil storage T formed inside the larger diameter inner periphery of housing body 50 through the communication oil passages 44 and 66. By the above-mentioned construction, at the discharge side of vane pump 3 is constituted a discharge side oil passage communicating with the oil flow chamber 64 through the discharge oil passage 43, annular groove 67 and communicating oil with the oil passages 46 and 47, and the variable throttle 6 is disposed on the way of this discharge side oil passage.

In FIG. 4, reference numeral 8 designates an antiskid braking device provided with a brake pedal 80 disposed within the vehicle, a master cylinder 81 for generating brake oil pressure corresponding to treading of the brake pedal 80, and a braking pressure controller 82 for distributing the brake oil pressure to brake cylinders (not shown) of each wheel. The braking pressure controller 82 is given the detected result of vehicle speed and rotational speed of each wheel and computes proper rotational speed for each wheel based on the extent of deceleration recognized by the detected speed to rationalize a slip ratio of each wheel and decides a proper braking force to be given to each wheel by comparing the computated result with detected result of rotational speed of each wheel and, in order to realize the result of comparison, adjusts the brake oil pressure generated by the master cylinder 81 to be distributed to the brake cylinders. The antiskid braking device operates to avoid wheel lock during the braking action, thereby preventing the phenomenon that the wheel loses its directional property and sideslips and enabling the stable braking action to be performed. To the other side of the chamber in the spool housing 62 in this embodiment, that is, to the pressure introduction chamber 65, the brake oil pressure generated by the master cylinder 81 is introduced through a pressure introduction pipe 69 connected to a pressure introduction port 68.

In the above-mentioned construction, the spool 61 is biased rightwardly in the drawing by brake oil pressure introduced into the pressure induction chamber 65 and acting on the end surface of the larger diameter portion 61b and leftwardly by the coil spring 63, and moves according to a balance of biasing force of brake oil pressure with that of coil spring 63. The leftward movement of spool 61 is restrained by abutment of the tip of stopper 61d against the end surface of pressure introduction chamber 65 at this time the opening end of communicating oil passage 46 into the oil flow chamber 64 is closed by the larger diameter portion 61a of spool 61 leaving a slight gap, and a passage area of the opening end increases corresponding to movement of spool 61 by the increase in the brake oil pressure P. In other words, the variable throttle 6 increases the throttle area in the discharge side oil passage of vane pump 3 by an increase in brake oil pressure P to lower the passage resistance. In order that change in the throttle area occurs slowly as the spool 61 moves, and that the oil flows smoothly from the oil flow chamber 64 to the communicating oil passage 46, the outer periphery of a portion between the larger diameter portion 61a and the connecting portion 61c is gently tapered from the former toward the latter.

In the second embodiment, when also the rotational speed difference is generated between the front and the rear wheels, as quite the same as the first embodiment, the driving force corresponding to the rotational speed difference caused between the front and the rear wheels is transmitted from the input shaft 1 to the output shaft 2. a change rate of transmitted driving force with respect to the rotational speed difference caused between the front and the rear wheels corresponds to that of oil pressure generated within the vane pump 3 with respect to the rotational speed difference so that a value of change rate depends on passage resistance of the discharge side oil passage at the vane pump 3, in other words, between the induction oil passage 42 and the oil storage T. Namely, when the passage resistance is larger, the front and the rear wheels are rigidly connected. On the contrary, when smaller, both wheels are loosely connected so that generation of rotational speed difference between both wheels is allowed to a certain extent. In this embodiment, the variable throttle 6 of main resistant component at the discharge side oil passage operates as the above-mentioned.

As a result, when the antiskid braking device 8 exerts the braking action, in other words, the braking pedal 80 is trod, the spool 61 moves corresponding to the brake oil pressure P generated thereby and the opening end of communicating oil passage 46 is opened to lower the passage resistance at the discharge side oil passage. In brief, when the braking action is exerted, the connection of the front and the rear wheels is relieved, whereby the braking action by the antiskid braking device 8 is not hindered. Also, magnitude of brake oil pressure corresponds to intensity of treading of brake pedal 80 and the lowering of passage resistance corresponds to the movement position of spool 61 depending on the magnitude of brake oil pressure P, whereby the connection is relieved corresponding to the intensity of treading of brake pedal 80. Accordingly, during the sharp braking action, the connection of front and rear wheel is approximately eliminated, whereby the stable braking action by operation of antiskid braking device 8 is not hindered. For a temporary tread of brake pedal 80 during the running, the connection of front and rear wheels is maintained to ensure high traveling performance by four-wheel drive.

Figure 5:
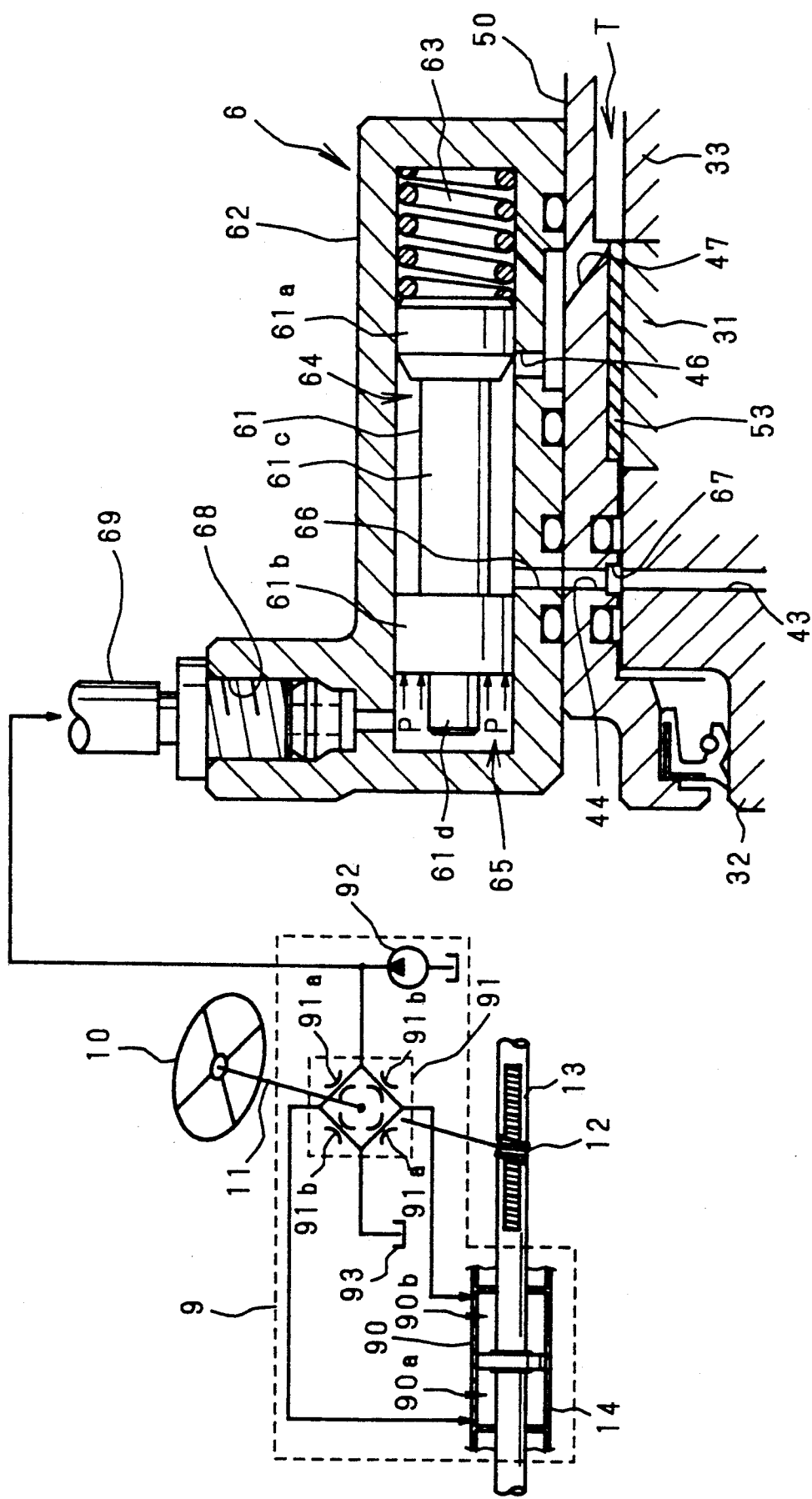
FIG. 5 is an enlarged view of characteristic portions of a third embodiment of the present invention.

Next, explanation will be given on a third embodiment of the present invention on reference to FIG. 5 in which a variable throttle for adjusting oil pressure of operating oil operates by oil pressure introduced in a power cylinder disposed in a steering mechanism. FIG. 5 is an enlarged view showing a characteristic portion of the third embodiment, in which the components same as those in FIGS. 1 and 4 are designated with the same reference numbers. The construction of the variable throttle in this embodiment is the same as that in the second embodiment.

In FIG. 5, reference numeral 9 designates a power steering device provided with a power cylinder 90 disposed in the part of a steering mechanism, a hydraulic control valve 91 for controlling oil pressure supplied to the cylinder 90 corresponding to the direction and magnitude of steering operation, and a hydraulic pump 92 of generation source of the supplied oil pressure. The power cylinder 90 and the hydraulic valve 91 are different in disposal construction corresponding to construction of the steering mechanism. In FIG. 5, a rack-pinion system steering mechanism is shown, which engages a pinion 12 fixed to the lower end of a steering wheel shaft 11 connected to a steering wheel 10 with a rack shaft 13 extending laterally of the vehicle body so that the rotation of steering wheel 10 is converted into lengthwise movement of rack shaft 13 to thereby perform steering. In this case, the power cylinder 90 is so constructed that a piston plate fixed to an intermediate portion of the rack shaft 13 is slidably inserted into a cylinder chamber formed by partitioning the interior of the housing 14 of the rack shaft 13 in a predetermined length, thereby forming a pair of oil chambers 90a and 90b separated from each other at both sides of the piston plate. Also, the hydraulic control valve 91 vertically cuts the steering wheel shaft 11 halfway thereof, connects the divided portions thereof through a torsion bar, inserts a spool formed in the vicinity of one connection end into a cylindrical valve body fixed to the other connection end, and forms, between the valve body and the spool, throttles 91a and 91b opening-closing according to the torsion of the torsion bar when a steering torque is applied to the steering wheel 10. The throttles 91a and 91b at the hydraulic control valve 91 are so constructed that, when one throttle increases a degree of throttle opening, the other decreases it. One throttle 91a are interposed between the one oil chamber 90a of power cylinder 90 and the hydraulic pump 92 and between the other oil chamber 90b and the oil tank 93 kept in low pressure, and the other throttle 91b are interposed between the oil chamber 90a and the oil tank 93 and between the oil chamber 90b and the hydraulic pump 92 respectively.

In the power steering device 9 constructed as the above-mentioned, when the torsion bar is twisted corresponding to the steering torque applied to the steering wheel 10, the generated oil pressure of hydraulic pump 92 is supplied to the oil chamber 90a in the power cylinder 90 through the throttle increasing in the degree of opening by the torsion, for example, throttle 91a. A pressure difference is generated between both the oil chambers 90a and 90b and oil pressure corresponding to the pressure difference is applied to the rack shaft 13 axially lengthwise thereof, whereby steering operation caused by axial movement of rack shaft 13 is helped. In addition, change in degree of opening caused by each throttle 91a or 91b in the hydraulic control valve 91 increases according to an increase in steering torque applied to the steering wheel 10, whereby magnitude of oil pressure applied to the power cylinder 90 through the hydraulic control valve 91 corresponds to degree of steering torque, that is, quantity of steering. The supplied oil pressure to the power cylinder 90 in the power steering device 9 is introduced from between the hydraulic pump 92 and the hydraulic control valve 91 into the pressure introduction chamber 65 at the variable throttle 6 through a pressure introduction pipe 69.

When the supplied oil pressure P to the power cylinder 90 in the power steering device 9 increases as the steering wheel 10 is operated for steering, the opening end of communication oil passage 46 is opened due to the movement of spool 61, thereby the passage resistance at the discharge side oil passage is lowered. Accordingly, when the steering is performed, the connection between the front and the rear wheels is relieved and a loose connection is realized between both wheels, thereby generation of rotational speed difference between both wheels is allowed. As a result, the tight corner braking phenomenon is effectively restrained. Also, magnitude of supplied oil pressure P corresponds to an extent of operation of the steering wheel 10 and a degree of reduction of the passage resistance corresponds to the movement position of spool 61 depending on the magnitude of supplied oil pressure P, so that the connection is relieved corresponding to the extent of steering. Accordingly, during the sharp turning, the connection of front and rear wheels is substantially eliminated, thereby generation of tight corner braking phenomenon can be reliably prevented. On the other hand, when a slight steering operation is carried out during the running, the rigid connection between the front and the rear wheels is maintained, whereby maintaining of a high traveling performance by the four-wheel drive is not hindered.

In addition, at the third embodiment, an example of applying the present invention to an automobile provided with the power steering device 9 in the rack-pinion system steering mechanism is described, but this embodiment is applicable to an automobile provided with a power steering device in a steering mechanism of other type.

The mode of construction and disposal of variable throttle 6 is not defined to the first, the second and the third embodiments. The hydraulic pump for generating oil pressure corresponding to the rotational speed difference between the front and the rear wheels is not limited to the vane pump 3 in each embodiment, but other pumps, such as a trochoid pump and a gear pump may be used.

Figure 6:
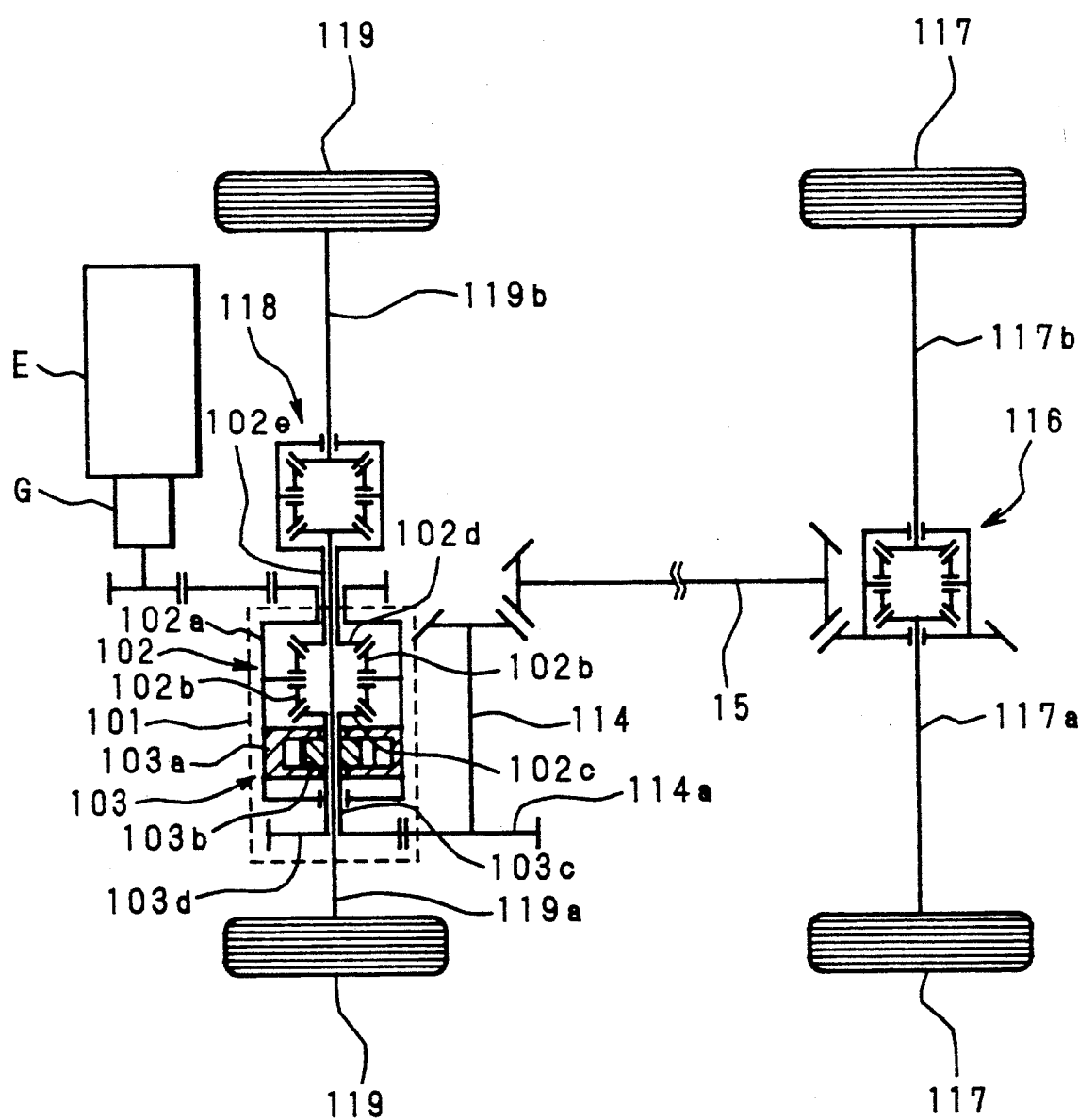
FIG. 6 is a typical plan view showing structure of a transmission system in a fourth embodiment of the present invention.

Next, an embodiment of a power transmission apparatus for four-wheel drive vehicle, which absorbs the rotational speed difference between the front and the rear wheels or the left side and the right side wheels, will be described. FIG. 6 is a typical plan view showing construction of a transmission system of a four-wheel drive vehicle in a fourth embodiment.

In FIG. 6, reference numeral 101 designates a power transmission apparatus for four-wheel drive vehicle for distributing a driving force of an engine E to front wheel 119 and rear wheels 117, which is provided with a differential gear mechanism 102 for absorbing a differential rotation and a vane pump 103 of hydraulic pump for limiting the differential movement of gear 102. The differential gear mechanism 102 is provided with a carrier 102a rotatably holding a plurality of planetary gears 102b and a pair of differential gears 102c and 102d disposed coaxially rotatably with the carrier 12a and engageable with respective planetary gears 102b. The vane pump 103 is provided with a casing 103a and a rotor 103b rotatably housed therein, so as to generate in the pump 103 oil pressure corresponding to the relative rotation generated between the casing 103a and the rotor 103b. As shown in the drawing, the carrier 102a of differential gear mechanism 102 is integrally constituted with the casing 103a of vane pump 103, one differential gear, 102c is integrally constituted with one-side end of a hollow rotor shaft 103c of rotor 103b.

A driving force generated by the engine E is transmitted from an output shaft of a reduction gear G attached thereto to the carrier 102a of differential gear mechanism 102 through a plurality of transmission gears. The driving force is distributed and transmitted through the planetary gears 102b held by the carrier 102a to a pair of differential gears 102c and 102d engageable therewith, corresponding to the rotational speeds thereof. The driving force distributed to the differential gear 102c is transmitted to a carrier in a rear wheel differential gear mechanism 116 provided for absorbing differential rotation between the left and the right rear wheels 117 through an intermediate transmission shaft 114 connected through a pair of spur gears 103d and 114a to the other end of the rotor shaft 103c and through a propeller shaft 115 connected through a pair of bevel gears to the intermediate shaft 114. Furthermore, after distributed by operation of the rear wheel differential gear mechanism 116 to the pair of differential gears corresponding to the rotational speeds of both gears, the driving force is transmitted to the rear wheels 117 through rear wheel shafts 117a and 117b separately mounted to both differential gears and extending laterally of the vehicle body. On other hand, the driving force distributed to the differential gear 102d is transmitted to a carrier in a front wheel differential gear mechanism 118 provided for absorbing the differential rotation of left side and right side front wheels 119 through a hollow differential gear shaft 102e of rotary shaft of the gear 102d. Furthermore, after distributed to a pair of differential gears by operation of gear mechanism 118 corresponding to the rotational speeds of both gears, one of the driving force passes the hollows of differential gear shaft 102e and rotor shaft 103c and is transmitted to one front wheel 119 through a front wheel shaft 119a extending at one side of vehicle body and, the other to the other front wheel 119 through a front wheel shaft 119b extending from the other side of vehicle body.

One differential gear 102c in the differential gear mechanism 102 rotates at the speed corresponding to average speed of left side and right side rear wheels 117, the other, 102d rotates at the speed corresponding to average speed of left side and right side front wheels. Accordingly, the driving force of engine E is distributed to the differential gears 102c and 102d by the well-known operation of differential gear mechanism 102 so as to be adjusted corresponding to the rotational speed of each gear, and then transmitted to the rear wheel 117 and front wheels 119, thereby materializing the four-wheel drive state. Since the carrier 102a in the differential gear mechanism 102 rotates at average speed of both differential gears 102c and 102d, when a rotational speed difference is generated between the front wheels 119 and the rear wheels 117, a rotational speed difference is generated between the carrier 192a and the differential gear 102c and relative rotation corresponding to the rotational speed difference is generated between the casing 103a of vane pump 103 integrally constituted with the carrier 102a and the rotor 103b for forming the differential gear 102c at the end of rotary shaft, so that oil pressure corresponding to magnitude of relative rotation is generated in the vane pump 103. The magnitude of oil pressure corresponds to a rotational speed difference generated between the carrier 102a and the differential gear 102c, in other words, the magnitude of rotational speed difference generated between the front wheels 119 and the rear wheels 117, and the oil pressure acts on between the casing 103a and the rotor 103b so as to restrain the relative rotation therebetween. Accordingly, between the carrier 102a and the differential gear 102c a limiting force increasing corresponding to the rotational speed difference between the front wheels 119 and the rear wheels 117 acts in order to eliminate a differential rotation therebetween, so that the differential rotation is limited in a predetermined range. As a result, for example, when the front wheels are idling, a sufficient driving force is distributed toward the rear wheels 117, thus the sufficient four-wheel drive state can be always obtained.

Figure 7:
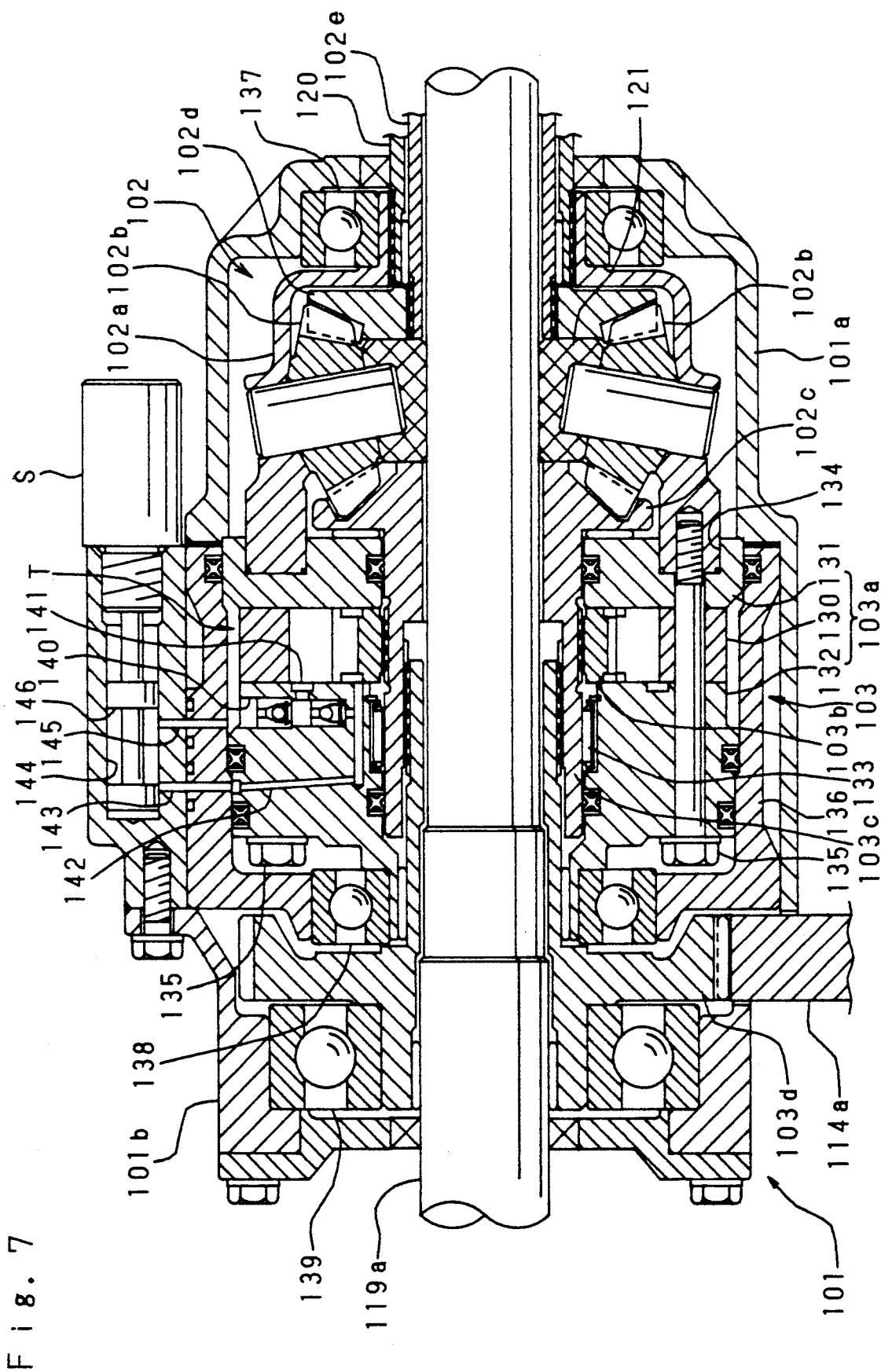
FIG. 7 is a longitudinally sectional view thereof.

FIG. 7 is a longitudinally sectional view of construction exemplary of the power transmission device 101 at the fourth embodiment of the present invention. The power transmission device 101 is so constructed that the differential gear mechanism 102 and vane pump 103 are integrally housed in cylindrical outside housings 101a and 101b fixed to the part of vehicle body and axially connected with each other, the carrier 102a in the differential gear mechanism 102 is a cylindrical member having a smaller diameter portion for supporting at one side. The planetary gears 102b of bevel gear are held within the carrier 102a, being rotatable around the axis intercrossing at a substantial right angle with the axis of carrier 102b. To the carrier 102a is connected a hollow drive shaft 120 by engaging splines formed at the inner periphery of smaller diameter portion with those at the outer periphery of one end of a hollow drive shaft 120. The driving force of engine E transmitted to the other end (not shown) of drive shaft 120 rotates the carrier 102a around the axis thereof. The hollow differential gear shaft 102e is inserted into the drive shaft 120 and supported relative-rotatably thereto. One differential gear 102d at the differential gear mechanism 102 is annular disc-like-shaped and larger in thickness and spline-coupled with one end of differential gear shaft 102e projecting into the carrier 102a with the toothed surface facing to the carrier 102a. The planetary gears 102b held thereto are respectively engaged with the differential gear 102d. The other end (not shown) of the differential gear shaft 102e is connected to the left side and the right side front wheels 119 through the front wheel differential gear mechanism 118. The differential gear shaft 102e and differential gear 102d rotate at the speed corresponding to the average speed of front wheels 119.

The casing 103a in the vane pump 103 is so constructed that cylindrical cam ring 130 of wall eccentricity is sandwiched between a side plate 131 of annular disc-like shape and a short cylindrical side plate 132, which are coaxially positioned, thereby forming a space enclosed by both the side plates 131 and 132 as the side walls within the cam ring 130. The rotor 103b of vane pump 103 is of well-known construction that vanes each of rectangular flat plate smaller in thickness are housed in a plurality of housing grooves formed on the cylindrical body of rotor and circumferentially spaced at regular intervals, and are housed in the space in the casing 103a coaxially therewith. The hollow rotor shaft 103c of rotary shaft for the rotor 103b is supported to the side plate 132 through a needle-like rotor bearing 133 internally fitted at the inner periphery thereof, and the rotor 103b is spline-coupled with an intermediate portion of rotor shaft 103c and integrally constituted therewith. Also, the rotor shaft 103c projects outside the casing 103a at the side plate 131 side, and at a flange larger in thickness and coaxially formed on the projecting end is formed the other differential gear 102c at the differential gear mechanism 102 with the tooted surface reversely facing to the side plate 131.

The larger diameter portion of carrier 102a engages with an annular gazing groove 134 rectangular in section and formed at the outside surface of side plate 131. The carrier 102a and the casing 103a of vane pump 103 comprising the cam ring 130 and side plates 131 and 132, are integrally constituted with each other by a plurality of fixing bolts 135 screwable with the engaging portion of carrier 102a with the side plate 132, cam ring 130 and side plate 131 being axially perforated in this order from the side plate 132 side. The differential gear 102c formed at the axial end of rotor shaft 103c is positioned facing to the other differential gear 102d in the carrier 102a and engaged with the planetary gears 102b, thereby the differential gear mechanism 102 is constituted. Between the differential gears 102c and 102d is interposed a spacer 121 for maintaining a constant axial interval between the gears 102c and 102d and for ensuring a proper engagement of the gears 102c and 102d with the planetary gears 102b. The inner ends of rotary shafts of planetary gears 102b are fitted into the spacer 121 respectively, which function also as bearings.

The casing 103a thus integrally constituted with the carrier 102a is fitted into an internal cylindrical housing 136 rotatably thereto and further, with the internal housing 136 fitted into an external housing 101a and supported to the interiors of external housing 101a and internal housing 136 by a ball bearing 137 interposed between the smaller diameter portion of carrier 102a and the external housing 101a and by a ball bearing 138 interposed between the cylindrical portion of side plate 132 axially outwardly projecting at the axis side and the internal housing 136. The spur gear 103d of the output end to the rear wheels 117 has a first hollow shaft short and of larger diameter and a second hollow shaft long and of smaller diameter at both axial sides in continuation of the spur gear 103d, and is supported within an external housing 101b by a ball bearing 139 interposed between the first hollow shaft and the external housing 101b. Splines formed at the outer periphery of the foremost end of the second hollow shaft inserted into the side plate 132 are engaged with those formed at the inner periphery of rotor shaft 103c, whereby the spur gear 103d connects with the rotor shaft 103c. The spur gear 103d connects with the left side and the right side rear wheels 117 through the spur gear 114a engageable therewith, intermediate transmission shaft 114, propeller shaft 115 and rear wheel differential gear mechanism 116. The rotor shaft 103c connected with the spur gear 103d, rotor 103b engageable with the rotor shaft 103c, and differential gear 102c formed at the axial end thereof, rotate at the speed corresponding to average speed of rear wheels 117.

Operating oil in the vane pump 103 is charged in an oil tank T of annular shape and formed between the inner periphery of internal housing 136 and the outer periphery of casing 103a. At the side plate 132 is formed an oil introduction bore 140 which opens the oil tank T at one end and extends radially inwardly. The oil induction bore 140 is provided therein with check valves juxtaposed to allow oil only to flow radially inwardly as shown, and communicates with suction/discharge ports 141 which is opened in the internal space in the cam ring 130 between both the check valves. At the side plate 132 is formed a discharge oil passage 142 which is opened to the interior of the cam ring 130 at the radial position corresponding to the bottom of housing groove in the rotor 103b, and extends axially of the side plate 132, and then extends radially outwardly thereof, and is opened in the annular groove at the outer periphery of side plate 132. The other end of the oil introduction bore 140 communicates with the discharge oil passage 142 on the way thereof. The annular groove at the outer periphery of side plate 132 communicates with a variable throttle chamber 144 circular in section formed at part of external housing 101a through a discharge oil passage 143. The variable throttle chamber 144 communicates with the oil tank T through a circulation oil passage 145. A spool 146 having two larger diameter portions is axially slidably fitted into the variable throttle chamber 144. The spool 146 slides in response to excitation of a solenoid S fixed to the external housing 101a, by which the larger diameter portions changes an opening area of discharge oil passage 143.

The suction/discharge ports 141 are circumferentially formed at a plurality of positions, and the oil introduction bore 140 and discharge port 142 are formed at a plurality of positions corresponding to the suction/discharge ports 141 respectively. When relative rotation occurs between the casing 103a and the rotor 103b, one suction/discharge port 141 at the upstream side in the rotation direction functions as the suction port and the other suction/discharge port 141 at the downstream side functions as the discharge port. The operating oil in the oil tank T flows radially inwardly in the oil introduction bore 140 connecting with the one suction/discharge 141, and flows into the cam ring 130, and rotates and rises in pressure in the state of being sealed between the respective vanes at the rotor 103b, so that oil pressure is generated within the casing 103a, and the oil pressure operates as the limiting force for restraining the relative rotation between the casing 103a and the rotor 103b. The operating oil in the casing 103a is discharged into the oil introduction bore 140 in continuation of the other suction/discharge port 141, flows radially inwardly in the oil introduction bore 140 and is introduced into the discharge oil passage 142, then it is introduced into the bottom of the housing groove at the rotor 103b and biases radially outwardly the vanes inserted in the housing grooves to press the vanes against the inner periphery of cam ring 130, and flows in the discharge oil passages 142 and 143, variable throttle chamber 144 and oil circulation passage 145, loses its pressure due to the flow resistance and returns to the oil tank T. Thus, oil pressure in the casing 103a is generated against the flow resistance at the discharge side, but the opening area of discharge oil passage 143 into the variable throttle chamber 144 changes corresponding to the sliding position of the slidable spool 146 slidable in the variable throttle camber 144, so an exciting current to the solenoid S for driving the spool 146 is controlled and the flow resistance is adjusted, whereby the generated oil pressure in the casing 103a, that is, the magnitude of limiting force acting between the casing 103a and the rotor 103b can be adjusted.

Next explanation will be given on operation of the power transmission apparatus 101 constituted as the above-mentioned. The driving force of engine E is transmitted to the carrier 102a through the drive shaft 120, and distributed toward the differential gear 102c and the differential gear 102d through the planetary gears 102b held by the carrier 102a, and transmitted in the rear wheels 117 and the front wheels 119 respectively. When no rotational speed difference is generated between the rear wheels 117 and the front wheels 119, the differential gear 102c and 102d rotate at equal speed, so the driving force is distributed to both gears at a ratio of 50 to 50. When the rotational speed difference is generated, a differential rotations corresponding thereto is also generated between the differential gears 102c and 102d, so the driving force of engine E is distributed more to the differential gear larger at the rotation speed. At this time, since the carrier 102a rotates at average speed of both differential gears 102c and 102d, relative rotation occurs between the casing 103a of vane pump 103 constantly rotatable with the carrier 102a and the rotor 103b integrally rotatable with the one differential gear 102. When such relative rotation occurs, oil pressure corresponding to the speed thereof is generated in the casing 103a so as to act as the limiting force to restrain the relative rotation between the casing 103a and the rotor 103b. Accordingly, between the differential gear 102c and the carrier 102a, the limiting force increasing as the rotational speed difference therebetween increases, acts to eliminate the rotational speed difference, so that the differential rotation between the differential gear 102c and the carrier 102a does not increase over a predetermined range. When the rotational speed of differential gear 102c is smaller than that of 102d, the driving force to be distributed to the rear wheels 117 through the differential gear 102c is sufficiently ensured, and when the rotational speed of differential gear 102c is larger, the same to the front wheels 119 through the differential gear 102d is sufficiently ensured, thereby the stable four-wheel drive condition can be realized.

In the power transmission device 101 of the present embodiment, the flow resistance at the discharge side of vane pump 103 is adjustable corresponding to sliding of spool 146 driven by the solenoid S, whereby characteristic of generated oil pressure in the casing 103a, in other words, characteristic of increase in the limiting force with respect to an increase in the differential rotation, is changeable. Accordingly, by the control of energizing the solenoid S corresponding to the vehicle speed, road surface condition and exerting of braking action, the various four-wheel drive state according to the running condition can be realized. Also, in this embodiment, the power transmission device 101 is constituted on the axis of the axle 119a of one front wheel 119, but is not limited to the above. However, it is desirable that the power transmission device 101, as shown in this embodiment, is disposed in the vicinity of engine E of drive source.

In addition, in this embodiment, the carrier 102a in differential gear mechanism 102 and casing 103a in vane pump 103 are integrally constituted by fixing the former to one side of the latter by fixing bolts 135, but may alternatively be integrally constituted by use of, for example, by forming integrally the side plate 131 of part of casing 103a with the carrier 102a.

In the above-mentioned fourth embodiment, the example is described in which the rotational speed difference between the front and the rear wheels is absorbed, the constitution in which the rotational speed difference between the left side and the right side front wheels or the left side and the right side rear wheels is absorbed may alternatively be considered.

Next, explanation will be given on a fifth embodiment modified of the fourth embodiment.

Figure 8:
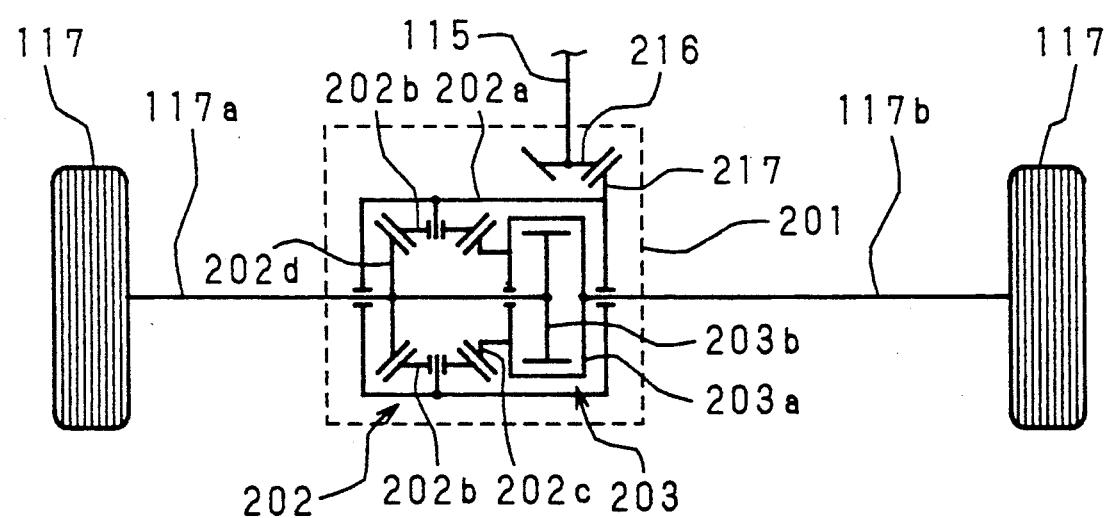
FIG. 8 is a typical plan view showing structure of a transmission system in a fifth embodiment of the present invention.

FIG. 8 is a typical structural plan view of a power transmission apparatus for four-wheel drive vehicle interposed between the left side and the right side wheels, in which the components designated by the same reference numerals as those in FIG. 6 show the same components shown therein.

In the drawing, reference numeral 201 designates a power transmission device for distributing the driving force of engine to the left side and the right side rear wheels 117. The power transmission device 201 is provided with a differential gear mechanism 202 for absorbing differential rotation between both rear wheels 117 and a vane pump 203 for limiting operation of the differential gear mechanism 202. The differential gear mechanism 202 is provided with carrier 202a for rotatably holding a plurality of planetary gears 202b and a pair of differential gears 202c and 202d respectively engageable therewith from both axial sides. The vane pump 203 is provided with a casing 203a and a rotor 203b rotatably housed therein, and generates oil pressure corresponding to relative rotation created between the casing 203a and the rotor 203b. One differential gear 202c of differential gear mechanism 202, as shown, is integrally constituted with a part of casing 203a of vane pump 203, the other differential gear 202d and rotor 203b of vane pump 203 are fixedly fitted onto an axle 117a connected to one rear wheel 117, and the differential gear 202d is integrally fixed to a part of rotary shaft of rotor 203b.

A bevel gear 217 is coaxially fixed to the outside of carrier 202a at the differential gear mechanism 202, and engages with a bevel gear 216 fixed to the rear end of a propeller shaft 115 for transmitting a driving force of engine to the rear wheels 117. Accordingly, the driving force transmitted by the propeller shaft is first transmitted to the carrier 202a through the bevel gears 216, 217 and then distributed to the differential gears 202c and 202d corresponding to the rotational speeds thereof through the planetary gears 202b held to the carrier 202a. An axle 117b connected to the other rear wheel 117 is coaxially fixed to the casing 203a at the reverse side of the differential gear 202c. When the driving force distributed to the differential gear 202c is transmitted to the rear wheel 117 through the casing 203a and axle 117b, the casing 203a rotates at equal speed to the rear wheel 117. Meanwhile when the driving force distributed to the differential gear 202d is transmitted to the rear wheel 117 through the axle 117a, the rotor 203b rotates at equal speed to the rear wheel 117.

Thus, the differential gears 202c and 202d rotate at equal speed to the left side and the right side rear wheels 117 respectively, whereby the driving force transmitted by the propeller shaft 115 is distributed to the differential gears 202c and 202d so as to be adjusted corresponding to the magnitude of rotational speeds of left side and right side rear wheels 117 by the well-known operation of differential gear mechanism 202. At this time, between the casing 203a of vane pump 203 and the rotor 203b thereof is generated relative rotation corresponding to the rotational speed difference caused between the left side and the right side rear wheels 117 and within the vane pump 203 is generated oil pressure changeable corresponding to the relative rotation, and the oil pressure acts between the casing 203a and the rotor 203b to restrain this relative rotation. Accordingly, in a case where the rotational speed difference occurs in the left side and the right side rear wheels 117 and the differential rotation occurs between the differential gear 202c and the differential gear 202d, the oil pressure changeable corresponding to the extent of differential rotation is generated in the vane pump 203, and the differential rotation between the differential gears 202c and 202d is restricted by an increasing force by an increase in differential rotation. Therefore, for example, even when one rear wheel 117 is idle, the rotational speed difference produced between both rear wheels does not excessively increase, but the distribution of driving force to the rear wheel 117 in the not-idling state is ensured, thereby inconvenience in the power transmission characteristic of the differential gear mechanism 202 is eliminated and materializing a satisfactory driving state is realized.

In addition, operation in this embodiment is the same as that in the fourth embodiment, whereby explanation thereof is omitted. Also, in this embodiment, the power transmission device 201 is interposed between the rear wheels 117, but may of course be interposed between the front wheels 119 (refer to FIG. 6).

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A power transmission apparatus for a four-wheel drive vehicle comprising:
    a housing fixed to the vehicle body;
    a hydraulic pump having a casing mounted within said housing and rotatably supported with its outer periphery adjacent the inner periphery of said housing and connecting front and rear wheels or left side and right side wheels of the vehicle by oil pressure produced therein corresponding to a rotational speed difference between said front and rear wheels or said left side and right side wheels;
    a variable throttle outside of said housing for receiving the oil generated in said hydraulic pump within said housing, adjusting the oil pressure and returning said oil to said hydraulic pump; and
    means for introducing into said variable throttle brake oil pressure generated by braking action, as operating oil pressure to said variable throttle.

2. A power transmission apparatus for four-wheel drive vehicle according to claim 1, further comprising an electromagnetic actuator for controlling operation of said variable throttle.

3. A power transmission apparatus for four-wheel drive vehicle according to claim 1, further comprising fins provided at the outer periphery of said housing so as to radiate the heat of the operating oil of said hydraulic pump.

4. A power transmission apparatus for four-wheel drive vehicle according to claim 1, further comprising an oil storage formed between the inner periphery of said housing and the outer periphery of said casing so as to store the operating oil of said hydraulic pump therein.

5. A power transmission apparatus for four-wheel drive vehicle according to claim 4, further comprising:
a first oil passage at said housing providing communication between a discharge side oil passage of said hydraulic pump and said variable throttle; and
a second oil passage at said housing and communicating said oil storage with said variable throttle.

6. A power transmission apparatus for four-wheel drive vehicle according to claim 1, further comprising first sealing means provided between the inner periphery of said housing and the outer periphery of said casing so as to prevent the operating oil of said hydraulic pump from leaking through a gap between both said inner periphery and said outer periphery.

7. A power transmission apparatus for four-wheel drive vehicle according to claim 6, wherein said first sealing means is disposed at the outer periphery of said casing and is in slidable contact with the inner periphery of said cylindrical fixed housing.

8. A power transmission apparatus for four-wheel drive vehicle comprising:
a housing fixed to the vehicle;
an hydraulic pump having a casing rotatably supported within said housing and connecting front and rear wheels or left side and right side wheels of the vehicle by oil pressure produced therein corresponding to a rotational speed difference between said front and rear wheels or said left side and right side wheels,
adjusting means outside of said housing for introducing the oil generated in said hydraulic pump thereinto, adjusting the oil pressure and returning said oil to said hydraulic pump,
first sealing means provided between the inner periphery of said housing and the outer periphery of said casing to prevent the operating oil of said hydraulic pump from leaking through a gap between both said inner periphery and said outer periphery;
second sealing means disposed at a side of the discharge side oil passage nearer said hydraulic pump than said first sealing means to prevent the operating oil of said hydraulic pump from leaking through a gap between both said peripheries.

9. A power transmission apparatus for four-wheel drive vehicle according to claim 8, wherein said second sealing means has a seal ring and an elastic member provided inside said seal ring and deformable due to magnitude of oil pressure of said operating oil.

10. A power transmission apparatus for four-wheel drive vehicle according to claim 9, wherein said seal ring is made of fluororesin.

11. A power transmission apparatus for four-wheel drive vehicle according to claim 9, wherein said elastic member is an O-ring.

12. A power transmission apparatus for a four-wheel drive vehicle comprising:
a housing fixed to the vehicle body;
a differential gear mechanism in said housing responsive to the rotational speed difference between the front and rear wheels or the left side and right side wheels of the vehicle;
a hydraulic pump having a casing mounted within said housing and rotatably supported with its outer periphery adjacent the inner periphery of said housing and restraining operation of said differential gear mechanism by oil pressure produced therein corresponding to a rotational speed difference between front and rear wheels or left side and right side wheels of the vehicle; and
a variable throttle, provided outside of said housing for introducing the oil generated in said hydraulic pump thereinto, adjusting the oil pressure and returning said oil to said hydraulic pump.

13. A power transmission apparatus for four-wheel drive vehicle according to claim 12, wherein
said differential gear mechanism has a pair of differential gears rotatable in association respectively with the front and rear wheels or the left side and right side wheels of the vehicle,
said hydraulic pump has a casing rotatable in association with one of the front and rear wheels or one of the left side and right side wheels and a rotor rotatable in association with the other of the front and rear wheels or the other of the left side and right side wheels,
and one of said differential gears and said casing are integral and the other of said differential gears and said rotor or a rotary shaft thereof are integral.

14. A power transmission apparatus for a four-wheel drive vehicle, comprising;
a housing fixed to the vehicle body;
a differential gear mechanism provided in said housing to respond to a rotational speed difference between the front and rear wheels or the left side and right side wheels of the vehicle;
an hydraulic pump for restraining operation of said differential gear mechanism;
adjusting means provided at the outer periphery of said housing so as to introduce the oil generated in said hydraulic pump thereinto, adjust the oil pressure and return said oil to said hydraulic pump, and
wherein said differential gear mechanism and said hydraulic pump are integral with each other.

15. A power transmission apparatus for four-wheel drive vehicle according to claim 14, wherein
said differential gear mechanism has a carrier rotatable in association with a drive source and a pair of differential gears rotatable in association respectively with the front and rear wheels or the left side and right side wheels of the vehicle,
said hydraulic pump has a casing rotatable in association with said carrier and a rotor rotatable in association with one of said differential gears,
and said carrier and casing are integral with each other, and one of said differential gears and said rotor or a rotary shaft thereof are also integral with each other.

16. A power transmission apparatus for a four-wheel drive vehicle comprising:
a housing fixed to the vehicle body;
a hydraulic pump having a casing mounted within said housing and rotatably supported with its outer periphery adjacent the inner periphery of said housing and connecting front and rear wheels or left side and right side wheels of the vehicle by oil pressure produced therein corresponding to a rotational speed difference between said front and rear wheels or said left said and right side wheels;

a variable throttle outside of said housing for receiving the oil generated in said hydraulic pump within said housing, adjusting the oil pressure and returning said oil to said hydraulic pump; and means for introducing into said variable throttle oil pressure of oil supplied to a power cylinder disposed in a steering mechanism, as operating oil pressure to said variable throttle.

17. A power transmission apparatus for four-wheel drive vehicle according to claim 16, further comprising an electromagnetic actuator for controlling operation of said variable throttle.

* * * * *